April 10, 1956 R. H. McMURTRIE 2,741,278
BACK PLATE WITH END DOGS FOR LOG-RIPPING SAW
Filed May 18, 1953 3 Sheets-Sheet 1

Robert H. McMurtrie
INVENTOR.

BY Clarence A. O'Brien
and Harvey B. Jackson
Attorneys

April 10, 1956  R. H. McMURTRIE  2,741,278
BACK PLATE WITH END DOGS FOR LOG-RIPPING SAW
Filed May 18, 1953  3 Sheets-Sheet 2

Robert H. McMurtrie
INVENTOR.

BY *Clarence A. O'Brien*
*and Harvey B. Jacobson*
Attorneys

April 10, 1956
R. H. McMURTRIE
2,741,278
BACK PLATE WITH END DOGS FOR LOG-RIPPING SAW
Filed May 18, 1953
3 Sheets-Sheet 3
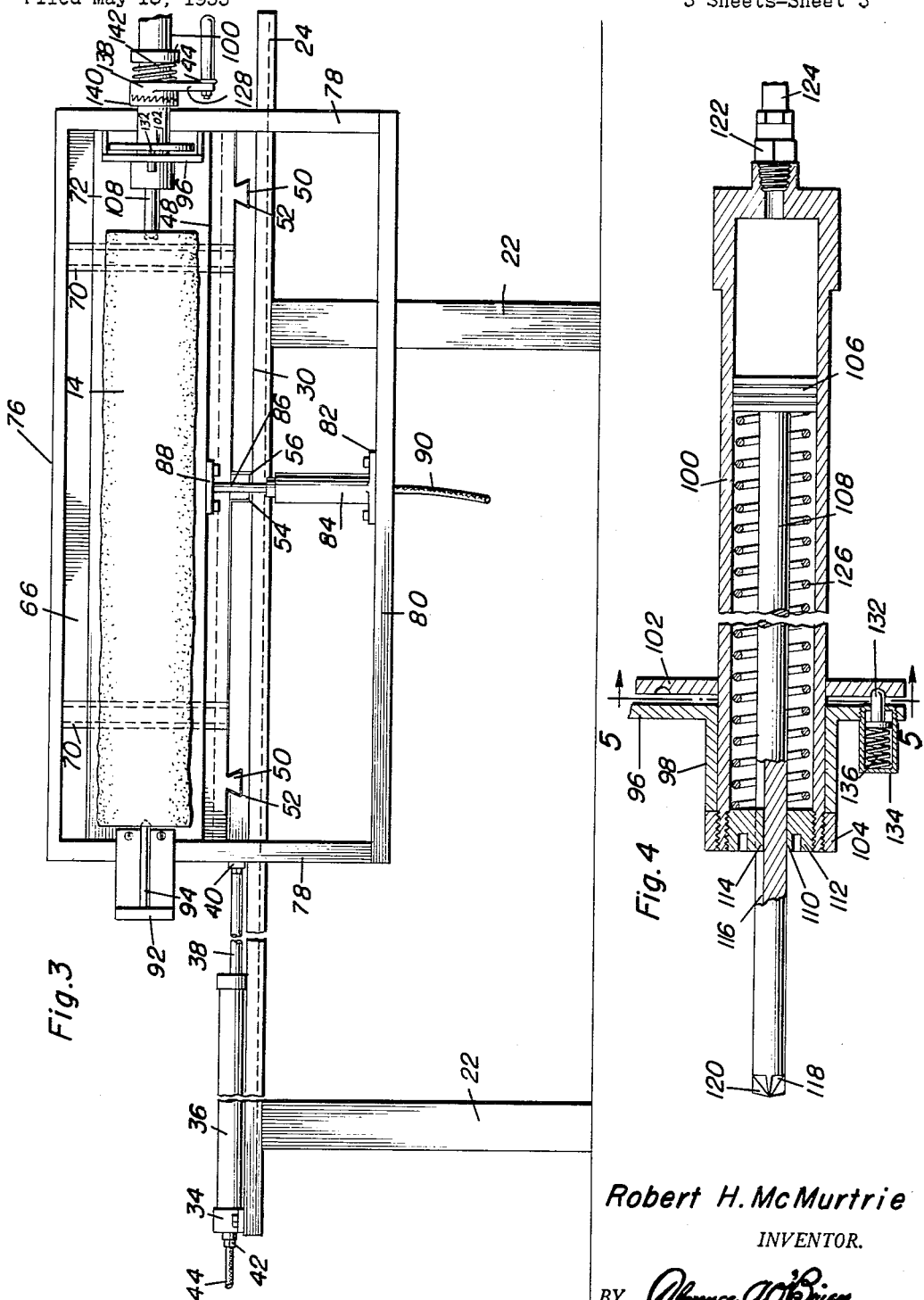
Robert H. McMurtrie
INVENTOR.

United States Patent Office 2,741,278
Patented Apr. 10, 1956

2,741,278

BACK PLATE WITH END DOGS FOR LOG-RIPPING SAW

Robert H. McMurtrie, Huntingburg, Ind.

Application May 18, 1953, Serial No. 355,499

2 Claims. (Cl. 143—117)

This invention relates in general to attachments for saws, and more specifically, to a back plate for saws.

In the lumber industry, there is a large quantity of relatively small logs which are referred to by the term "bolts" which are generally wasted inasmuch as there is not provided proper means for sawing the same efficiently. It is therefore the primary object of this invention to provide an improved back plate for saws which may be utilized in the sawing of such bolts into small slabs or desired polygonal cross-sectional shapes.

Another object of this invention is to provide an improved attachment for saws, especially band saws, which may be utilized for rigidly holding bolts and feeding the same into the blade of a band saw whereby the bolts may be cut to the desired configurations.

A further object of this invention is to provide an improved back plate for saws which includes an elongated support having mounted thereon bolt support means, said bolt support means being reciprocable longitudinally of the elongated support for moving a bolt relative to a saw blade during a cutting operation, said bolt support means also including means for adjusting a bolt towards a saw blade and vertically thereof in addition to means for selectively rotating a bolt about its longitudinal axis to produce members of the desired cross-sections.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a longitudinal vertical sectional view taken substantially upon the plane indicated by the section line 3—3 of Figure 2 and shows the specific means for vertically adjusting bolt holding means relative to the remainder of the back plate, the saw blade of the band saw being omitted;

Figure 5:
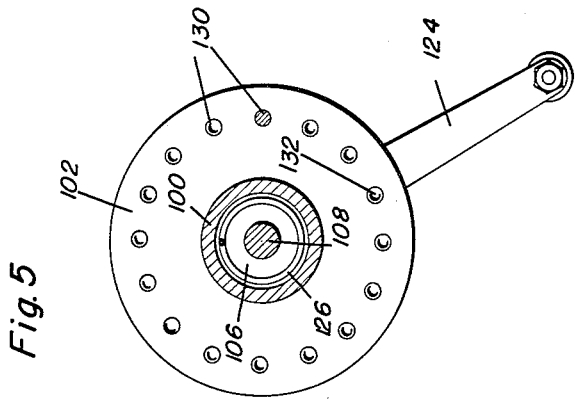

Figure 4 is an enlarged fragmentary sectional view taken substantially through the center of a movable bolt engaging pin and the means for supporting and selectively rotatably positioning the same; and Figure 5 (Sheet 2) is a transverse sectional view taken substantially upon the plane indicated by the section line 5—5 of Figure 4 and shows the general construction of an indexing device for selectively rotatably positioning the movable pin whereby elongated members of different cross-sections may be selectively cut from a bolt.

Referring now to the drawings in detail, it will be seen that there is illustrated a conventional band saw which is referred to in general by the reference numeral 10. The band saw 10 includes a vertically moving blade 12 which is adapted to engage a bolt 14 and saw sections of wood therefrom. The bolt is adjustably carried by the back plate for saws, which is the subject of this invention, the back plate for saws being referred to in general by the reference numeral 16.

The back plate for saws 16 includes an elongated support which is referred to in general by the reference numeral 18 and bolt support means which are referred to in general by the reference numeral 20.

Figure 2:
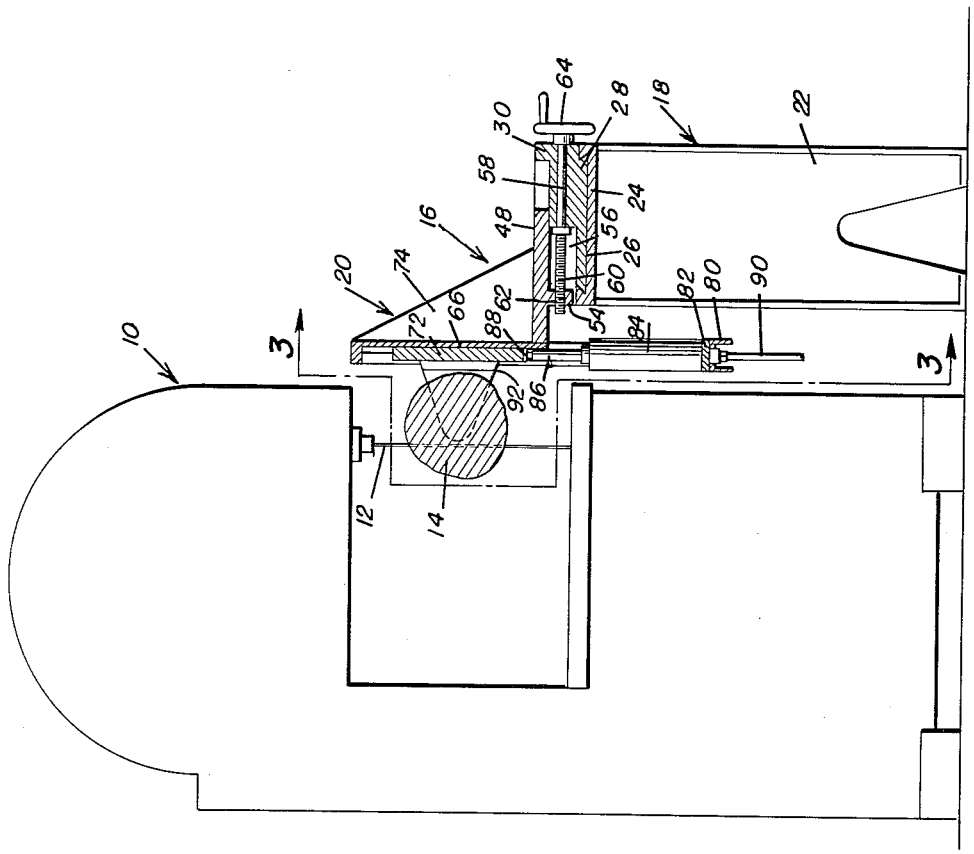
Figure 2 is a transverse vertical sectional view taken substantially upon the plane indicated by the section line 2—2 of Figure 1 and shows the construction of both the means for facilitating longitudinal and transverse adjustment of the bolt holding means in addition to the relative location of a bolt with respect to the band saw.

The elongated support 18 includes a pair of longitudinally spaced end frames 22 which are connected together at their upper ends by a horizontal plate 24. The plate 24 is provided throughout its entire length with an enlarged guideway 26 of the dovetail type (Fig. 2). Disposed in the guideway 26 is an elongated rib forming a guide member 28. The guide member 28 is formed integrally with a platform 30 which forms a portion of the bolt support means 20.

Figure 1:
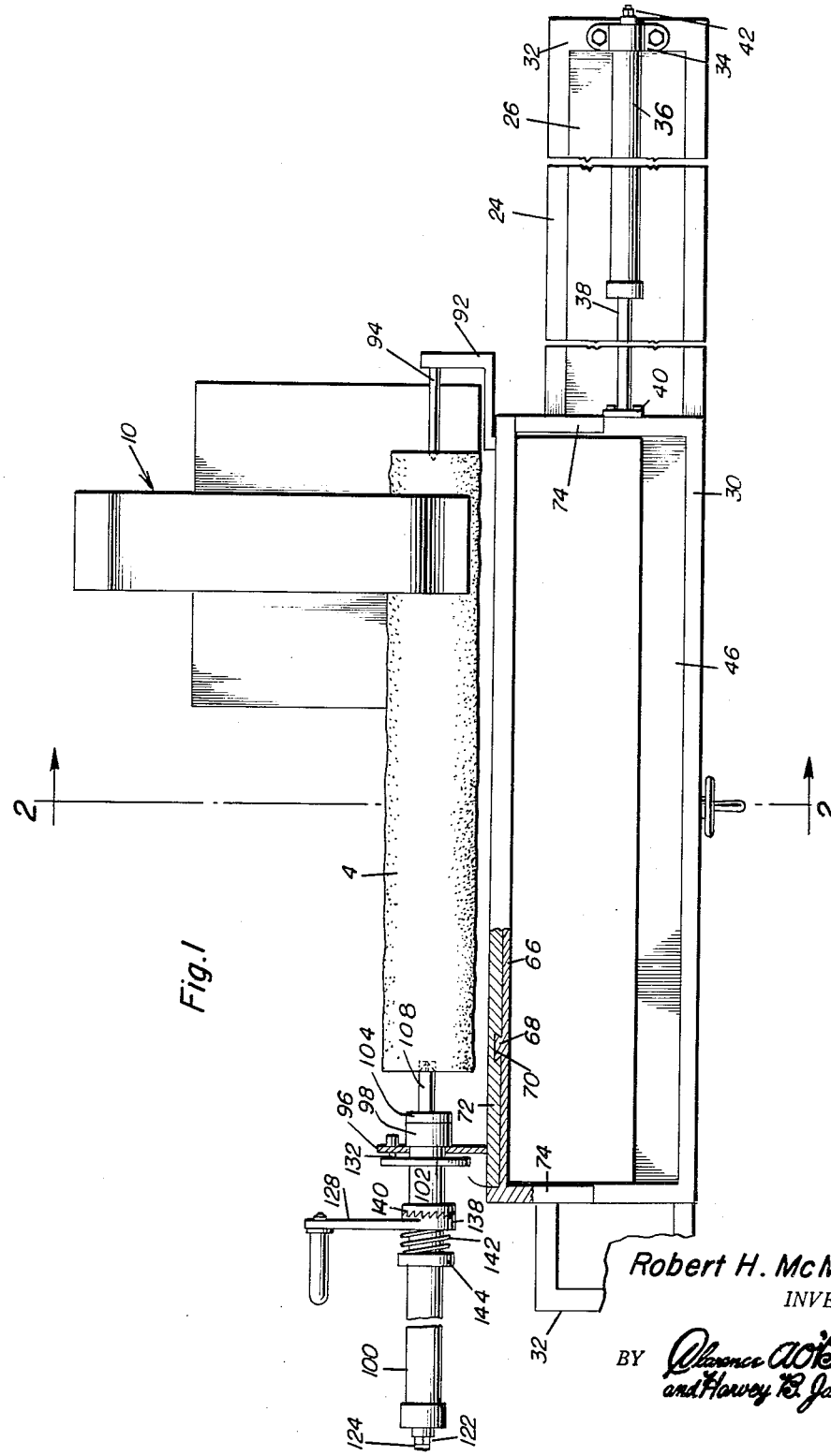
Figure 1 is a top plan view of the back plate for saws and shows the same positioned relative to a band saw in the process of cutting a slab from a bolt, portions of the bolt holding means being broken away and shown in section in order to clearly illustrate the means for facilitating vertical adjustment of the same.

Referring now to Figures 1 and 3 in particular, it will be seen that the ends of the guideway 26 are closed by transverse portions 32. Carried by one of the transverse portions 32 is a mounting bracket 34 for a longitudinally extending fluid cylinder 36 which overlies the guideway 26. The fluid cylinder 36 includes a plunger 38 whose free end is connected by a bracket 40 to an associated end of the platform 30. The hydraulic cylinder 36 is provided with a fluid line fitting 42 which may be connected to a suitable fluid line 44. It will be understood that the fluid line 44 is connected with a hydraulic source and operated by remote valve means (not shown). By proper manipulation of such valve means, the platform 30 can be reciprocated relative to the elongated support 18.

Carried by the platform 30 in overlying relation thereto and partially seated in an enlarged recess 46 therein is a supporting plate 48. The supporting plate 48, as is best illustrated in Figure 3, is provided at its underside with a pair of spaced parallel guides 50. The guides 50 are of the dove-tail type and are slidably mounted in transverse dove-tail grooves 52 in the platform 30.

The supporting plate 48 also includes a centrally located depending rib 54 which is disposed in a transverse slot 56 in the platform 30. Rotatably mounted in the platform 30 in longitudinal alignment with the transverse slot 56 is a rotatable shaft 58 (Fig. 2). The rotatable shaft includes a threaded end portion 60 which is threadedly engaged within an internally threaded bore 62 in the rib 54. Rigidly connected to the other end of the shaft 58 is a handle 64 for rotating the same. Upon rotation of the handle 64, the shaft 58 is rotated relative to the rib 54 with the result that the supporting plate 48 is moved transversely of the platform 30. Due to the relationship of the guides 50 and their respective guideways 52, it will be seen that the transverse movement of the supporting plate 48 will be guided.

Carried at the side of the supporting plate 48 remote from the platform 30 is a vertical guide plate 66. The guide plate 66 has formed on the outer side thereof outwardly projecting spaced parallel guides 68. The guides 68 are of dove-tail shape (Fig. 1) and are guidingly seated in dove-tail grooves 70 in a mounting plate 72.

The guide plate 66 is re-enforced relative to the supporting plate by a pair of gusset plates 74 which project upwardly from the upper surface of the supporting plate 48. The guide plate 66 also has secured to the upper and side edges thereof an inverted U-shaped frame 76 (Fig. 3) which includes a pair of spaced parallel depending legs 78 which depend downwardly beyond the lower edge of the guide plate 66. The legs 78 have their lower ends connected together by a lower horizontal frame member 80 which extends longitudinally of the back plate.

Carried by the horizontal frame member 80 and secured thereto by a mounting flange 82 is a fluid cylinder 84. The fluid cylinder 84 is provided with a vertically projecting plunger 86 having a mounting flange 88 at the upper end thereof. The mounting flange 88 is secured to the lower edge of the mounting plate 72. The fluid cylinder 84 is provided with a fluid line 90 which may be connected to a suitable fluid supply and controlled by a valve (not shown). Through the use of the valve, the mounting plate 72 may be vertically adjusted.

Carried by one end of the mounting plate 72 is an L-shaped bracket 92 (Fig. 1) which is provided with an inwardly directed longitudinally extending pin 94 for engagement in one end of the bolt 14.

Carried by the opposite end of the mounting plate 72 is a mounting bracket in the form of a plate 96. As is best illustrated in Figure 4, the plate 96 has a tubular central portion 98 in which is rotatably mounted a fluid cylinder 100. The fluid cylinder 100 is provided with an indexing plate 102 adjacent one end thereof. The indexing plate 102 is disposed closely adjacent the plate 96 and the tubular portion 98 of the plate 96 is confined between the indexing plate 102 and a collar 104 threadedly engaged on an adjacent end of the fluid cylinder 100.

The fluid cylinder includes a piston 106 longitudinally reciprocable therein, the piston 106 being carried by an elongated plunger 108. The plunger 108 passes through a bore 110 in an end wall 112 closing said one end of the fluid cylinder 100. The end wall 112 includes a key portion 114 projecting into the confines of the bore 110 and disposed within an elongated key way 116 of the plunger 108 to prevent relative rotation of the plunger 108 with respect to the fluid cylinder 100. The outer end of the plunger 108 is provided with a point 118 which includes a plurality of prongs 120 adapted to engage into an opposite end of the bolt 14 and non-rotatably connect the same to the plunger 108.

It will be noted that the end of the fluid cylinder 100 opposite from the end wall 112 is provided with a fitting 122 which connects a fluid line 124 to the fluid cylinder 100. It will be understood that the fluid line 124 is connected to a suitable fluid source and flow of fluid therethrough is controlled by a valve (not shown). Through the remote actuation of the valve, the plunger 108 may be extended. Inasmuch as the plunger 108 is in the form of a bolt engaging pin and in alignment with the bolt engaging pin 94, it will be seen that various lengths of bolts 14 may be accommodated. The piston 106 is urged toward the fitting end of the fluid cylinder 100 by an elongated coil spring 126 disposed therein and surrounding the plunger shaft 108.

In order that a bolt 14 carried between the plunger 108 and the pin 94 may be selectively rotated relative to the saw blade 12 of a band saw 10, the fluid cylinder 100 is provided with a crank 128, as is best illustrated in Figure 5. In order that the cylinder 100 may be positioned relative to the plate 96, the index plate 102 is provided with a plurality of recesses 130 in the face thereof adjacent the plate 96. The recesses 130 are circumferentially spaced and in alignment with a detent 132 (Fig. 4) carried by the plate 96. The detent 132 is carried by a sleeve 134 which has disposed therein a spring 136 urging the detent 132 towards the index plate 102 and into engagement with one of the recesses 130. It will be seen that through the use of the indexing plate 102 and the detent 132, the fluid cylinder 100 may be rotatably positioned so as to form members of polygonal cross-section from a bolt 14.

The elongated support 18 is disposed adjacent the forward edge of the band saw 10 and extends longitudinally of the width of the same in spaced parallel relation to the saw blade 12. The supporting plate 48 projects inwardly towards the saw blade 12 with the mounting plate 72 in spaced parallel relation thereto. The mounting bracket 92 and the plate 96 project inwardly towards the saw blade 12 and their associated pin 94 and plunger shaft 108, respectively, are disposed in the center of a bolt 14 with portions of the bolt projecting inwardly into alignment with the band saw blade 12. When an initial cut is to be made of a bolt 14, the bolt supporting means 16 are moved longitudinally of the elongated support 18 with the result that the saw blade 12 passes through the bolt 14 to cut a slab therefrom. If it is desired to take another parallel cut, the mounting plate 72 is moved inwardly through the use of the handle 64.

In the event that it is desired to cut a polygonal cross-section member from the bolt 14, after each cut the fluid cylinder 100 and its associated plunger 108 are rotated the desired amount through the use of the indexing plate 102. Rotation of the plunger shaft 108 results in the rotation of the bolt 14 so that the next cut may be made at an angle to the previously made cut. In this manner, by continuously rotating and setting the bolt 14, the bolt may be cut into an elongated member of a polygonal cross-section.

Referring now to Figures 1 and 3 in particular, it will be seen that the crank 128 is actually connected to a sleeve 138 rotatably mounted on the hydraulic cylinder 100 and having teeth in engagement with teeth of a collar 140 fixed relative to the fluid cylinder 100. The sleeve 138 is urged towards the sleeve 140 by a spring 142 mounted on the fluid cylinder 100 and retained against movement away from the sleeve 138 by a collar 144. Due to this particular connection between the crank 128 and the fluid cylinder 100, the fluid cylinder may be conveniently rotated with the crank remaining in a conveniently actuatable position.

While certain of the means for moving various portions of the back plate are fluid operated and others are screw operated, it will be understood that all of the means may be fluid operated or screw operated.

Inasmuch as many of the means for adjustably positioning elements of the back plate for saws 16 are remotely controllable, it is seen that the back plate may be actuated from a remote point without endangering the operator of the same.

From the foregoing, the construction and operation of the device will be readily understood and since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is a follows:

1. In combination with a bandsaw of the type including an upright frame and a vertically running blade, a back plate attachment comprising an elongated, vertically disposed support positioned adjacent said bandsaw frame, said support including an uppermost horizontal base plate, a platform carried by said plate for guided longitudinal movement therealong, a supporting plate carried by said platform for guided transverse movement, a vertically disposed frame carried by said supporting plate between said upright frame and said vertically disposed support, a mounting plate carried by said vertically disposed frame for guided vertical movement, a fixed bolt supporting pin carried by said mounting plate adjacent one end thereof, a movable bolt supporting pin carried by said mounting plate in longitudinal alignment with said fixed bolt supporting pin for movement towards and away therefrom, and means connected to said movable bolt supporting pin for indexing a bolt disposed between said bolt supporting pins relative to said blade.

2. In combination with a bandsaw of the type including an upright frame and a vertically running blade, a back plate attachment comprising an elongated, vertically disposed support positioned adjacent said bandsaw frame, said support including an uppermost horizontal base plate, a platform carried by said plate for guided longitudinal movement therealong, a supporting plate carried by said platform for guided transverse movement, a vertically disposed frame carried by said supporting plate between said upright frame and said vertically disposed support, a mounting plate carried by said vertically disposed frame for guided vertical movement, said vertically disposed frame including a lower frame member, an extensible fluid motor carried by said lower frame member, said fluid motor having a plunger connected to said mounting plate for selectively vertically positioning said mounting plate within said vertically disposed frame, a fixed bolt supporting pin carried by said mounting plate adjacent one end thereof, a movable bolt supporting pin carried by said mounting plate in longitudinal alignment with said fixed bolt supporting pin for movement towards and away therefrom, and means connected to said movable bolt supporting pin for indexing a bolt disposed between said bolt supporting pins relative to said blade.

References Cited in the file of this patent

UNITED STATES PATENTS

| | | |
|---|---|---|
| 109,436 | Mayo | Nov. 22, 1870 |
| 259,551 | Kester | June 13, 1882 |
| 324,669 | Donecker | Aug. 18, 1885 |
| 375,887 | McIntyre | Jan. 3, 1888 |
| 490,131 | Ames | Jan. 17, 1893 |
| 626,846 | Stewart | June 13, 1899 |
| 707,184 | Thomas | Aug. 19, 1902 |
| 1,394,128 | Weir | Oct. 18, 1921 |
| 2,561,746 | Merrill | July 24, 1951 |

FOREIGN PATENTS

| | | |
|---|---|---|
| 468,647 | France | Apr. 29, 1914 |